United States Patent [19]

Neumann

[11] 3,816,984

[45] June 18, 1974

[54] AIR FILTER HOUSING FOR FILTERING SUSPENDED SUBSTANCES

[75] Inventor: Gerhard Max Neumann, Berlin, Germany

[73] Assignee: Delbag-Luftfilter GmbH, Berlin, Germany

[22] Filed: Dec. 29, 1972

[21] Appl. No.: 319,658

[52] U.S. Cl. ............... 55/502, 55/481, 210/236, 210/237, 210/241, 254/126, 403/43
[51] Int. Cl. ............................................. B01d 46/52
[58] Field of Search ............ 55/490, 493, 502, 504, 55/509, 511, 478–481; 74/89.14, 89.15, 99; 254/126; 210/236, 237, 241; 403/43, 45, 343

[56] References Cited
UNITED STATES PATENTS

| | | | |
|---|---|---|---|
| 298,568 | 5/1884 | Fisher | 254/126 |
| 3,507,100 | 4/1970 | Neumann | 55/509 X |
| 3,593,503 | 7/1971 | Andrews | 55/496 X |

Primary Examiner—Frank W. Lutter
Assistant Examiner—William Cuchlinski
Attorney, Agent, or Firm—Watson, Cole, Grindle & Watson

[57] ABSTRACT

An housing having an air filter therein movable by means of a turnbuckle arrangement into sealing contact with a frame-like contact surface of the housing, the turnbuckle arrangement assuring a uniform contact pressure with said surface.

5 Claims, 8 Drawing Figures

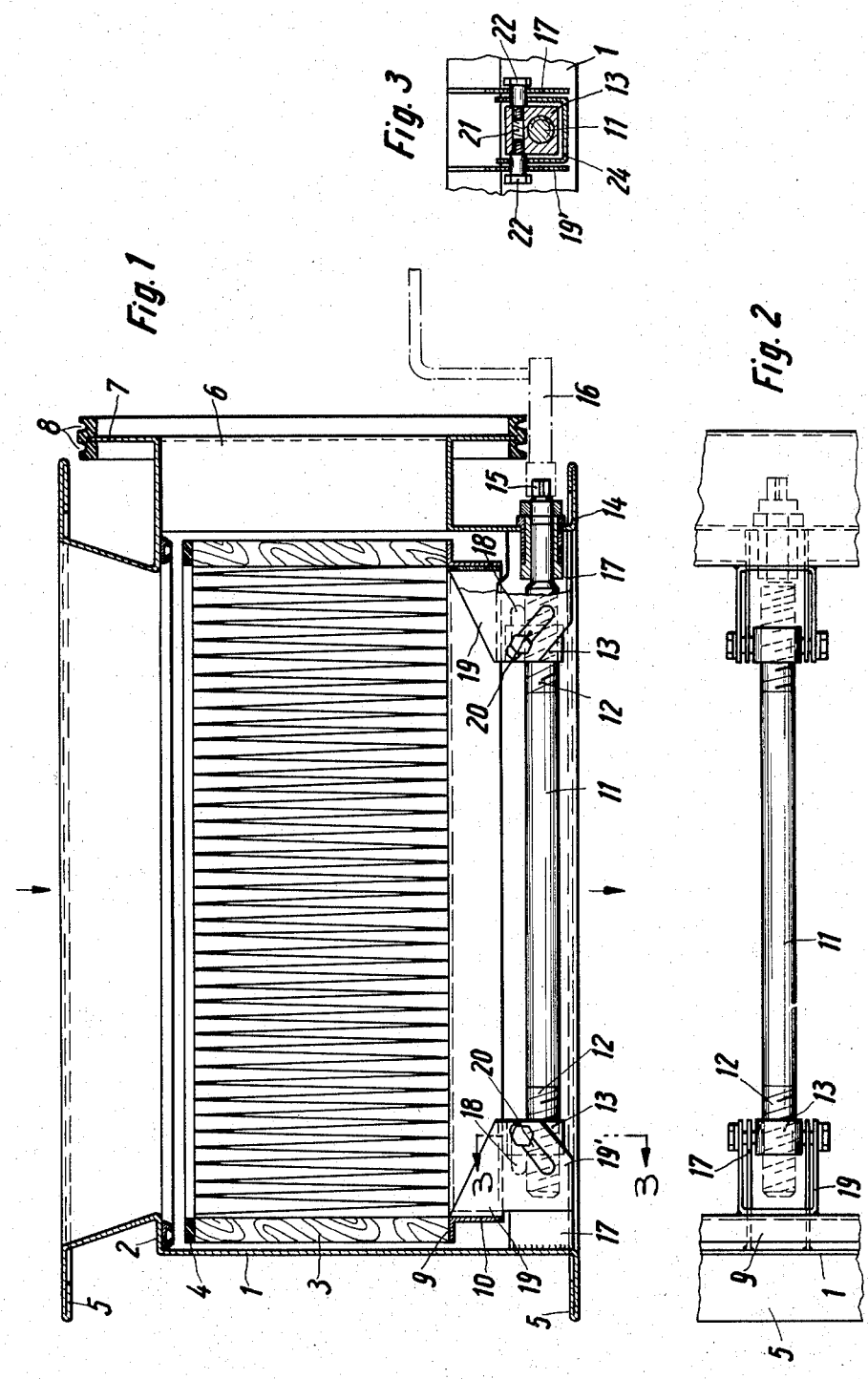

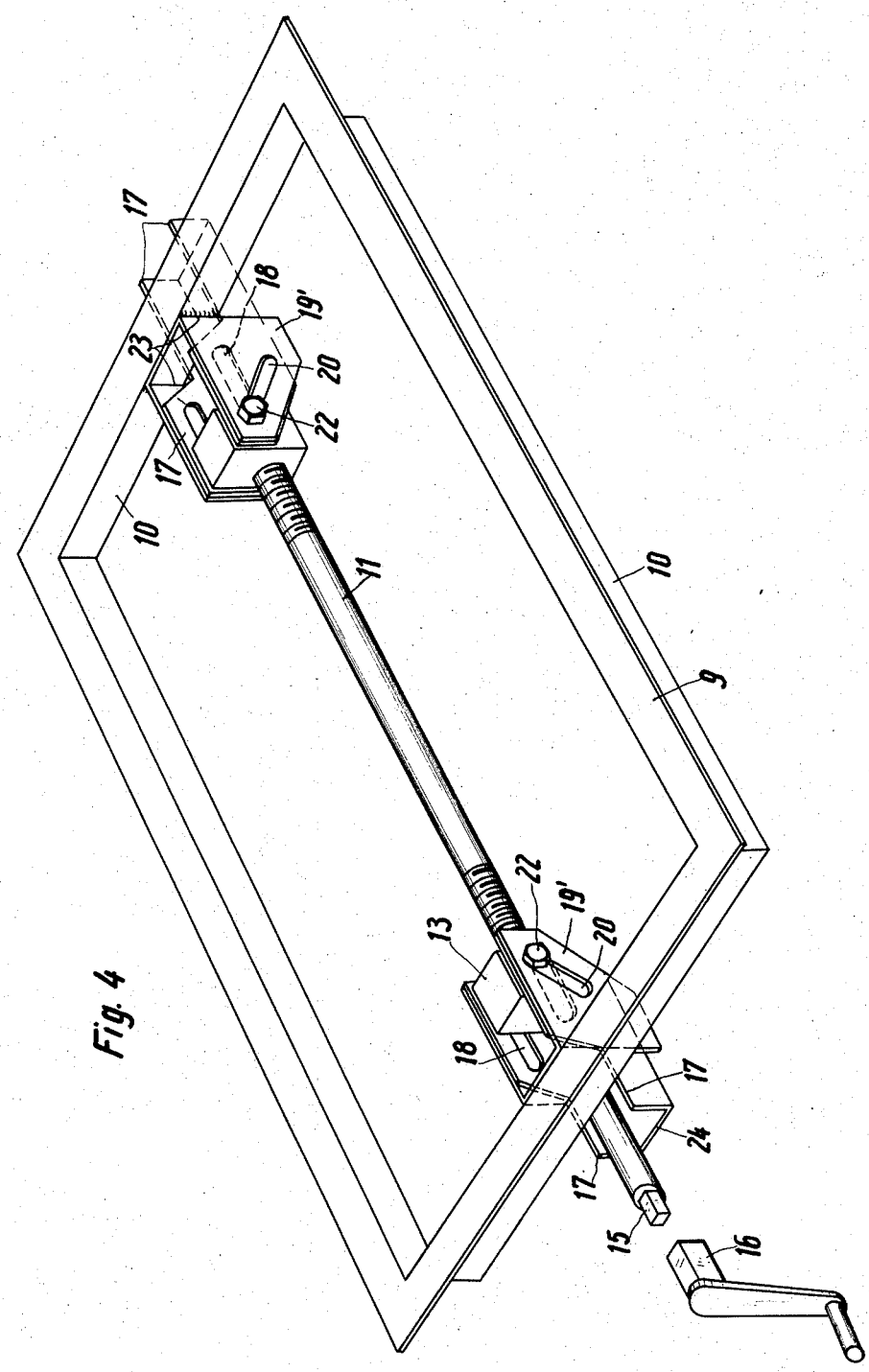

AIR FILTER HOUSING FOR FILTERING SUSPENDED SUBSTANCES

This invention relates to a housing having an air filter for suspended substances, a turnbuckle being provided for sealing the filter element uniformly against a frame, the contact pressure surface of the housing.

Such air filter housings have been known in which the filter element can be pressed against a frame-shaped pressure surface located in the housing, and sealed therein by means of a pressure frame while being shifted in the housing. Turn spindles, operable from outside the housing are provided at their ends with oppositely oriented threads, lying parallel to the pressure frame, to effect a contact pressure. Nuts are threaded on to the spindles for movement in engagement with the pressure frame through intermediate elements. In such prior art air filter housings, the threaded spindle is rotatably mounted in the housing walls on each of two opposite inside walls of the filter housing; each of the fixedly rotatably arranged nuts moving oppositely on the spindle, carries two levers articulated on opposite sides of the nut, which engage with the common axis of a pressure member lying between them. The levers with the threaded spindle constitute an isosceles triangle, the height of which decreases, whenever the nuts move apart, and the height of which increases whenever the nuts are moved toward one another. The pressure member common to all levers, contacts the middle of one side of the contact frame. In order to achieve a sealing contact of the filter element in the housing, it is necessary for two such arrangements to contact in the middle on opposite sides of the contact frame.

This known arrangement has several serious drawbacks. For example, two threaded spindles with their parts are needed on opposite sides of the contact frame, as a result of which an absolutely uniform contact pressure of the filter element is highly improbably since the two threaded spindles cannot be tightened with absolute uniformity. A further drawback consists in the fact that the height of the construction of this known arrangement is relatively great because of the necessary levering movement between the nuts and the pressure member. a further drawback is that the contact pressure exerted by the movement of the nuts on the common pressure member must be absorbed directly by the threaded spindle, so that the danger exists when very high contact pressures are required that the threaded spindle is deflected downward, as the result of which the sealing fit of the filter-element on the housing cannot be maintained with absolutely certainty (German Utility Patent 1,965,042).

Another contact pressure arrangement has been known through German Utility Patent 1,709,671, which does not make use of a threaded spindle having oppositely oriented nuts. Here, a locally fixed nut is disposed in the housing, in which a threaded bolt can be threaded in or out. The threaded bolt contacts a rail with its end, which can be shifted in two directions, namely, with regard to height, and transversely by means of two fixed articulated levers contacting the two ends of the rail, or by means of a guide bolt fixed in a slitlike perforation of the rail, sloping upwardly. In this embodiment, also, it is necessary to permit such contact pressure arrangements to contact at two opposite sides of the contact pressure frame. Accordingly, an absolutely uniform contact pressure of the filter element cannot be achieved with this arrangement either. Furthermore, there is the disadvantage that the rail must be capable of shifting in height at the end of the threaded bolt, which must be considered a drawback in the case of the high contact pressures. The most essential disadvantage, however, consists in that, during exertion of the contact pressure, the rail will move relative to the filter element resting on it. Since the filter elements must be incorporated in the housing with lateral play for reasons of production engineering and reasons of tolerance, the filter element is shifted by the rail in a transverse direction during the pressure process, until it rests against one side of the housing. During a further contact pressure movement, a relative movement of the rail occurs with respect to the frame of the filter element, thereby leading to damage of the frame.

It is an object of the present invention to provide a threaded spindle as a contact pressure arrangement for an air filter housing, which can be operated unilaterally by a crank and which is equipped with oppositely oriented nuts, which arrangement avoids the disadvantages of the known, prior art and which, for the lowest acceptable height of construction, assures an absolutely uniform contact pressure of the filter element against the frame-like contact pressure surface, provided in the filter housing; and, for any lateral shifting, any damage to the frame of the filter-element is avoided.

This object is achieved according to the present invention, by disposing the spindle, operable by means of a crank and provided with a left hand and a right hand thread in the plane of the middle axis of the pressure frame, by guiding the nuts in tongues overlapping the nuts on both sides, fixedly attached on opposite walls of the housing and provided with horizontal elongated openings. The attached guide elements are provided with sloping elongated openings and outwardly overlap the tongues, the guide elements being secured to perpendicular bridges at opposite sides of the pressure frame, and the sloping elongated openings of the guide element at each end of the frame slanting inwardly toward one another. The nuts are rectangular in cross-section and are provided with guide bolts penetrating both the elongated openings of the tongues and of the guide elements. By the present arrangement, it is possible to dispose a single threaded spindle located centrally between the pressure frame end walls and thus centrally between the filter element end walls, thereby assuring an absolutely uniform contact pressures on the entire surface of the frame. The nuts, which move toward and away from one another by reason of their left hand and right hand threads, are guided in horizontal elongated openings of the tongues which are attached to opposite sides of the filter housing. The tongues therefore absorb the contact pressure produced by the nuts, thus relieving the threaded spindle of bending forces and protecting it from a harmful deflection. Because the guide elements of the pressure frame overlap the tongues, a low installation height is assured and an absolutely perpendicular adjustment of the pressure frame is guaranteed without there being any possibly of damage of any type.

A further characteristic of the invention is that each of the guide bolts, which are threaded, engage with a threaded bore located above and transversely to the threaded opening of the nut. Such an arrangement, accordingly, simplifies the assembling operation since, after the tongues and the guide elements are brought together, the threaded guide bolts are simply engaged with the threaded bores of the nuts.

The invention is further characterized in that the tongues are formed by the free legs of an upwardly open U-rail, and the guide elements each have U-shaped profile attached with their back portions to the perpendicular bridges of the pressure frame. Also, the guide elements have guide cheeks containing the sloping elongated openings.

A further characteristic of the invention is that the frame is U-shaped in cross-section, thin walled, downwardly open presenting a test groove profile, provided with inwardly directed legs and capable of being in attached gas-tight relationship with the frame shaped contact pressure surface of the filter housing. The filter element may therefore be tightly sealed with the frame, and the frame can be acted upon in a known manner with pressurized air for the purpose of monitoring leaks of the seal. Monitoring for leaks between the filter element and the housing by the use of standing compressed air is known per se.

In the case of the known embodiments, this monitoring for leaks is brought about by a special development of the contact surface of the housing, receiving the seal of the filter element. In one such embodiment, two bridges forming a chamber are attached to the lateral housing wall, which penetrate the seal of the filter element with their ends pointed downwardly and forming a gap. The standing compressed air is introduced into the chamber formed by the bridges. In another such embodiment, the contact surface of the filter housing is rearwardly bent in the shape of a U, so that a chamber is also formed with the seal of the filter element, into which the standing compressed air is fed. Although known embodiments do not necessitate considerable additional expenditures in the production of the filter housing itself, they are nevertheless not universal and do not provide the advantages achieved herein. However, in the embodiment of the present invention, the U-shaped frame providing a test groove for testing the seal, can be attached to the sealing contact pressure surface, which is customarily provided in the filter housing, whenever the filter housing is to be used for a purpose wherein such a test of the seal is required. The same filter housing, omitting the U-shaped test-groove frame can, however, also be used in such housings where monitoring leaks between the housing and the seal of the filter element during operations is not required. The expenditure in production techniques for the housing will be reduced insofar as one and the same housing can be used according to choice for purposes in which a testing of the seal is not required or where it is required for reasons of safety. A pipe connection is attached to this test frame for feeding in compressed air for testing the seal between which penetrates in the frame and the contact surface of the filter housing. This pipe is welded to the horizontal flange portion of the test frame.

The attached drawings show an embodiment of the invention by way of example.

FIG. 1 is a side view of the filter housing with the contact pressure arrangement not in a contact pressure position;

FIG. 2 is a top view of the contact pressure arrangement of FIG. 1;

FIG. 3 is a sectional view of the contact pressure arrangement taken along line 3—3 of FIG. 1;

FIG. 4 is a perspective view of the contact pressure arrangement together with the pressure frame;

Figure 5:
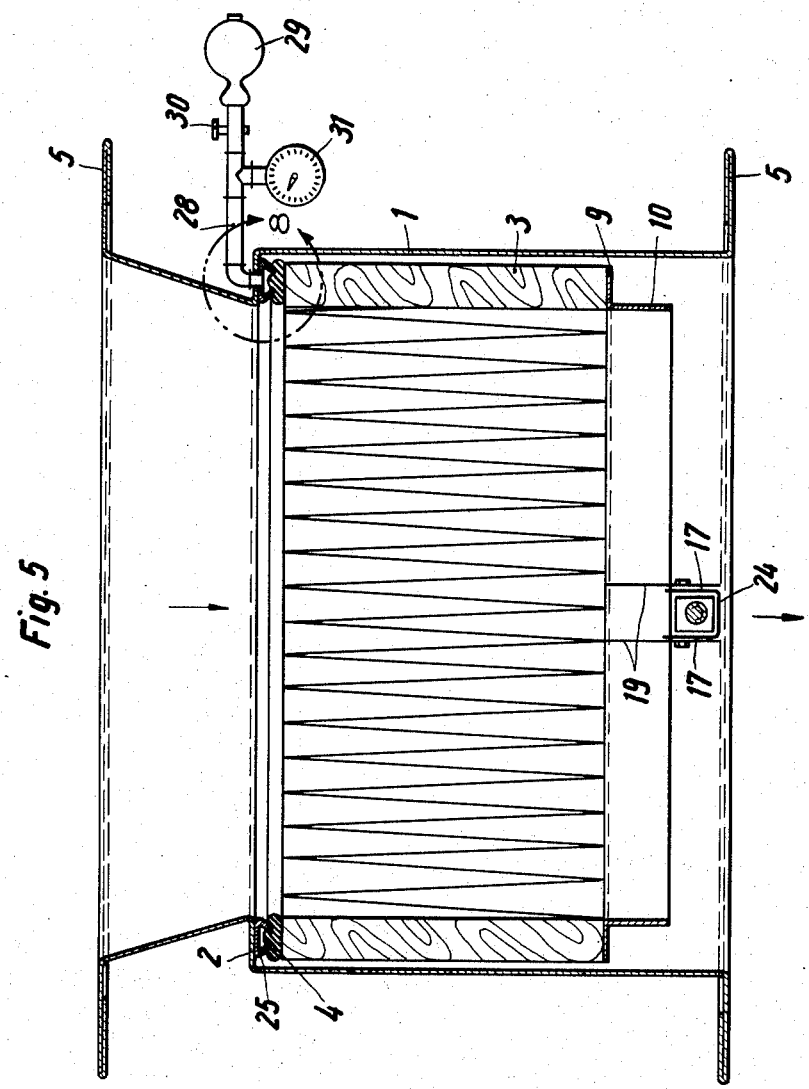
FIG. 5 is a front view of the arrangement of FIG. 1.
Figure 6:
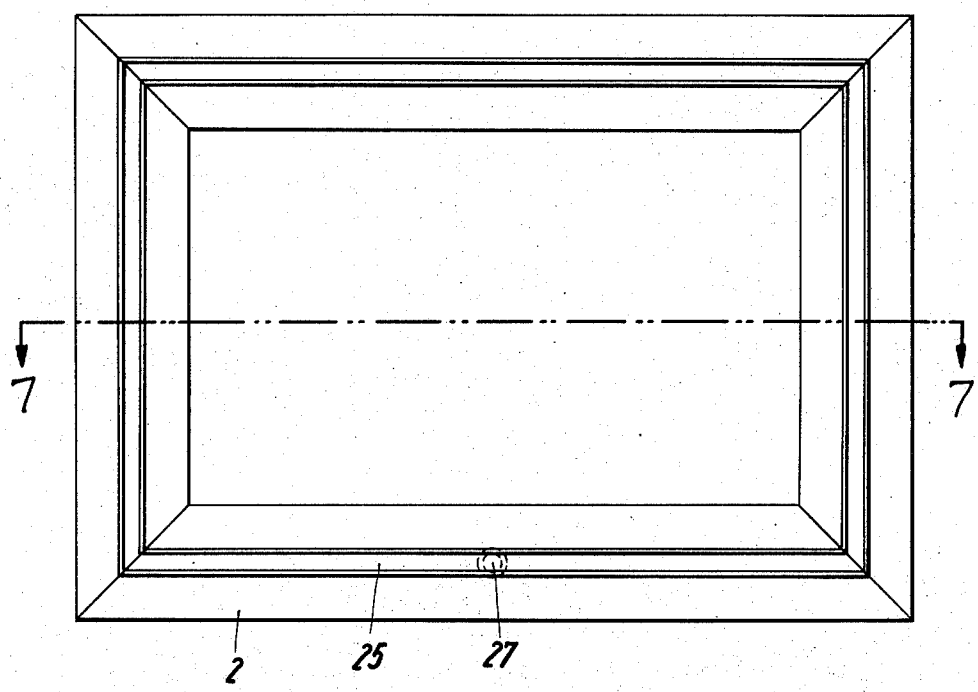
FIG. 6 is a top view of the frame-shaped contact pressure surface of the housing with a frame-shaped rail provided for testing the seal.
Figure 7:
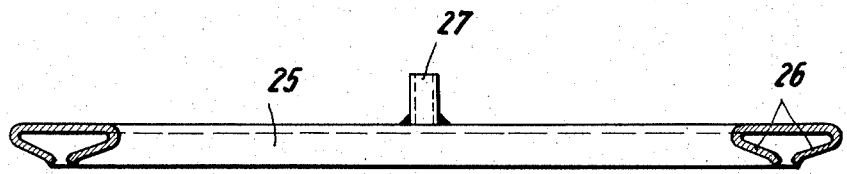
FIG. 7 is a sectional view of the frame-shaped rail taken along the line 7—7 of FIG. 6.

In FIG. 1, an air filter housing 1 is shown provided with a bent frame-like contact pressure surface 2 for an air filter element 3 designed for suspended substances, element 3 having a seal 4 and housing 1 having a connecting flange 5 at both ends. An insertion open 6 for filter element 3 is disposed in a lateral wall of housing 1, opening 6 having a collar 7 provided with grooves 8 along its outer edges for the reception of a plastic bag, not shown, and which can be closed by a lid, likewise not shown. The plastic bag serves in a known manner for the reception of filter element 3 when changed.

Below filter element 3, a contact pressure frame 9 supporting the frame of the filter element 3 is provided as having an inner perpendicular bridge 10. The contact pressure arrangement is supported by pressure frame 9 by means of a threaded spindle 11, nuts 13, tongues 17 and guide elements 19. Threaded spindle 11 lies centrally between opposite sides of filter element 3 and is mounted in a lateral wall of the housing with a seal bearing 14. Threaded spindle 11 is provided with a square adjusting element 15 at its end projecting outwardly of bearing 14, and can be rotated clockwise or counterclockwise by means of a crank 16 in engagement with element 15. Threaded spindle 11 is provided at both ends with oppositely oriented threads 12, a square nut 13 cooperating with each thread so that upon the corresponding rotation of threaded spindle 11, nuts 13 can be moved either toward or away from one another.

Secured to opposite walls of filter housing 1, tongues 17 overlap square nut 13 on both sides thereof, and each tongue has horizontal elongated openings 18. A guide element 19, having sloping elongated openings 20, is attached to perpendicular bridge 10 of pressure frame 9 also on opposite sides of the pressure frame, openings 20 of the two opposite guide elements 19 sloping inwardly toward one another. The two tongues 17 fastened to the housing wall and enclosing nuts 13, are united by means of an upwardly open central U-shaped element 24. Each guide element 19 is U-shaped in section (see FIG. 2), and is attached at its back portion to the perpendicular bridge 10 of pressure frame 9. The sloping elongated openings 20 are located in cheeks 19' of each guide element which extend toward one another. As shown in FIG. 3, each nut 13 has a threaded bore 21 located above and perpendicularly with respect to the nut thread. Screw bolts 22 engage with the threads of bore 21 from opposite ends thereof. A guide bolt 22 extends through both openings 18 and 20 on one side of spindle 11 and another bolt 22 extends through openings 18 and 20 on the opposite side of spindle 11, for each nut, as in FIG. 3.

Whenever the two nuts 13 are moved away from one another from the position shown in FIG. 1 through a corresponding turning of threaded spindle 17 by means of crank 16, they are guided by screw bolts 22 in openings 18 of tongues 17, since the latter are fixedly secured to wall 1 of the housing. At the same time, guide elements 19 are lifted along with pressure frame 9 attached thereto, by means of openings through 20 of cheeks 19' thereby moving filter element 3 upwardly until its seal 4 sealingly contacts frame-shaped contact pressure surface 2. At the same time, the contact pressure force exerted by guide elements 19 on pressure frame 9 during rotation of threaded spindle 11, is absorbed by tongues 17 attached to the housing 1, so that threaded spindle 11 itself is not subjected to bending forces.

Since, as shown in FIG. 4, cheeks 19' of guide elements 19 can freely overlap tongues 17, whenever pressure frame 9 is in a lowered position, in which the filter element 3 with its seal 4 is out of engagement with the contact pressure surface 2 of housing 1, the required height of construction of the contact pressure arrangement is minimized.

Figure 8:
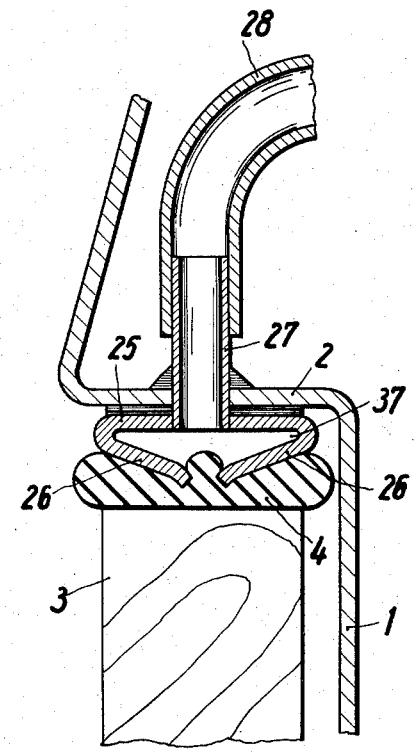
FIG. 8 is an enlarged sectional view taken at 8 in FIG. 5.

In order to detect or monitor for a leak of seal 4, a downwardly open U-shaped test groove rail 25 is provided forming a frame, the legs 26 of which — as shown particularly in FIG. 8 — are bent inwardly so that the edges thereof engage with seal 4 of filter element 3. Rail 25 is attached along the frame shaped contact pressure surface 2 of housing 1. A pipe 27, penetrating contact pressure surface 2, is attached to the flat back flange of rail 25 and a compressed air duct 28 is connected to pipe 27. As shown in FIG. 5, duct 28 terminates in a compressed air source 29. A manometer 31 is connected with the pipe 28 and a locking valve 30 is inserted into pipe 28 between manometer 31 and source 29 for the compressed air. The chamber 37, formed by test groove-rail 25 and seal 4, is pressurized by compressed air from compressed air source 29. Thereafter, locking valve 30 is closed, so that manometer 31 records the excess pressure prevailing in chamber 37. Whenever the sealing effect between seal 4 and test groove rail 25 relaxes, the pressure recorded in the manometer 31 drops, since a portion of the compressed air escapes from chamber 37. The pressure drop in chamber 37 is reported by an optic or acoustic recording (not shown), produced by the manometer, so that the sealing effect can be re-established by tightening spindle 11, whereupon chamber 37 by opening of the valve 30 is again acted upon by the full air pressure and valve 30 is again closed.

Obviously, many modifications and variations of the invention are made possible in the light of the above teachings. It is therefore to be understood that within the scope of the appended claims the invention may be practiced otherwise than as specifically described.

What is claimed is:

1. An air filter housing having a turnbuckle, a pressure frame, a filter element mounted on said frame located within said housing, the filter element being designed for the purification of air of toxic or radioactive dust or gases, said housing having frame-like contact pressure surface against which said element is made to bear by means of said turnbuckle which includes a spindle, said spindle lying parallel to said surface beneath said filter and being rotatable about its longitudinal axis, said spindle having oppositely oriented threads at its respective ends, a threaded nut in threaded engagement with each of said respective threads capable of movement toward and away from one another during rotation of said spindle, a crank connected to said spindle for rotation thereof, said spindle being located centrally of the opposite side walls of said filter element, a tongue element for each said nut, each said tongue element being mounted on said housing and having portions of each thereof lying adjacent opposite sides of each said nut for preventing rotation thereof, each said portion of each said tongue element having a horizontal elongated opening therein, a guide element for each said tongue element, each said guide element being mounted on said frame and each having a cheek lying adjacent each said tongue element portion, each said cheek having a sloping elongated opening therein, said openings of one of said guide elements sloping toward said filter and toward the openings of the other one of said guide elements, each of said nuts being rectangular in cross-section and having a transverse opening therein, and a guide bolt in engagement with said transverse opening and extending through said elongated openings of said tongue element portion and of said cheek lying at each said side of each said nut whereby, upon rotation of said crank for moving said nuts away from one another, said filter is moved into engagement with said surface as said tongue elements move along their respective openings.

2. The housing according to claim 1 wherein each said transverse opening is internally threaded and each of said guide bolts is threaded to provide for a threaded engagement with said transverse openings, and each said transverse opening being located above the threaded opening of its respective nut.

3. The housing according to claim 1 wherein each said tongue comprises an upwardly open U-shaped rail, and wherein each said guide element is U-shaped in cross-section opening toward its respective nut, each said guide element being secured to said frame at their respective base flanges.

4. The housing according to claim 1 further comprising a rail secured to said contact pressure surface, said rail being U-shaped in cross-section with its legs extending toward said filter and with its back flange being secured to said surface, a seal element mounted on said filter for sealing engagement with said rail legs upon movement of said filter during rotation of said crank, a pressure line connected with said rail and opening into the space between said rail legs, whereby the sealing engagement between said rail legs and said seal element may be monitored by the introduction of pressure into said space through said line.

5. The housing according to claim 4 wherein said pressure line extends in a gas-tight manner through both said contact pressure surface and the back flange of said rail.

* * * * *